much are the Patent Office 2,743,211
Patented Apr. 24, 1956

2,743,211

RHODANINES

Joseph T. Bashour, New York, N. Y., assignor to Stauffer Chemical Company, a corporation of Delaware No Drawing. Application September 24, 1954,
Serial No. 458,271

9 Claims. (Cl. 167—33)

This invention relates to certain novel rhodanines as compositions of matter, and to the use of such rhodanines as pesticides.

The compounds of the present invention have the following structural formula:

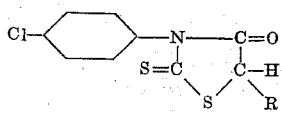

In accordance with the present invention, R may be either a methyl or an ethyl radical. Thus, the compounds covered by the present invention consist of 3-(p-chlorophenyl)-5-methyl rhodanine and 3-(p-chlorophenyl)-5-ethyl rhodanine.

The novel compounds of the present invention can be made in the following manner:

Example 1.—3-(p-chlorophenyl)-5-methyl rhodanine. A mixture of 510 grams of p-chloroaniline, 456 grams of carbon bisulfide and 1,000 ml. of ethanol was stirred and chilled to 0° C. To this was added, with agitation, 58.6 grams of ammonia as a 29% aqueous solution. At the end of two hours of stirring, a thick slurry was obtained. This was then treated with a cold solution of sodium alpha bromopropionate (prepared from 612 grams of alpha bromopropionic acid). After standing over-night, yellow crystals had formed. The mixture was acidified with 1600 ml. of dilute hydrochloric acid and heated for two hours at 65° C. Upon cooling, the crude rhodanine was separated by filtration. The crude material was recrystallized from glacial acetic acid. The overall yield of recrystallized product, M. P. 116–117° C., was 70%.

Example 2.—3-(p-chlorophenyl)-5-ethyl rhodanine. The same method was used as in Example 1 except that 668 grams of alpha bromobutyric acid was substituted for alpha bromopropionic acid. After recrystallization from glacial acetic acid, a yield of 67% of product, M. P. 88–89°, was obtained.

The compounds of the present invention have been found to be effective against insects, nematodes, fungi, and mites. One particularly important application of the present invention is in the treatment of rice seed to prevent white tip disease. The white tip disease of rice is caused by microscopic nematodes which move up the plant from the roots. The presence of the nematodes causes symptoms which include white leaf tips, lower yields, and a change in the rice so that the characteristic desirable and identifying qualities of a variety may be lost. The nematodes for the most part are carried between the hull and the seed so that infection of new plantings may be prevented by seed treatment. The effects of the white tip disease vary from one variety to another so that certain varieties are very susceptible and some are not. Unfortunately, the susceptible varieties include some of the best varieties grown in the United States. Heretofore, known insecticides and nematocides have been unsuccessful in combating this pest and the compounds of the present invention are unique in providing a highly effective treatment for this disease.

For use as a seed treatment, the compounds of the present invention can be used without dilution but preferably are made up into the form of a wettable powder. Such a wettable powder can conveniently contain about 40% of active ingredient, 55% of a finely divided solid material such as clay, and 5% of a wetting agent such as Duponal 51, a sulfated high aliphatic alcohol wetting agent. The 40% concentration has been used because the dosage was adapted to the mechanical seed treaters now used in this country. For other methods of application, e. g. hand treatment, other concentrations and dosages might be more suited; for example, four ounces of a 10% wettable powder per bushel of rice have performed as well as the one ounce of 40% strength. A wettable powder such as this can be used either dry or wet. Preferably, the wettable powder is made in the form of a slurry by adding a small amount of water thereto and the slurry presents the advantage of sticking better to the seeds when mixed, and also prevents the inhalation of dust by workmen. In use, about one ounce of the 40% wettable powder would be added to one bushel of rice seed with or without the addition of water. The material is then agitated for a sufficient length of time to ensure complete dispersal of the active ingredient over the surface of the rice, whereupon the rice is stored in a closed container for at least seventy-two hours and then planted. Field studies have shown that such applications of these compounds to rice result in almost complete freedom from the white tip disease.

The compounds of the present invention are also effective fungicides, as is shown by the fact that the compounds completely inhibit the growth of Aspergillus niger at a concentration of ten parts per million when incorporated in a nutrient agar medium, while similar plates of agar, not treated, support a luxurious growth.

Similar tests have shown the efficiency of the compound in inhibiting the growth of S. fructicola and Stemphyllium.

The compounds of the present invention have also been found effective against insects and other pests. The compounds have been tested and found effective against such pests as the common house fly, Musca domestica L., cabbage aphis, Brevicoryne brassicae (L.), the army worm, Cirphis unipunta (Haw.), and the two-spotted mite, Tetranychus bimaculatus (Harvey). These particular rhodanines are also highly effective agents for treating soil and particularly for the control of nematodes.

In order to show the effectiveness of these compounds as nematocides, they were tested against root-knot nematodes of the genus Meloidogyne. The soil employed in the test was a dark-colored sandy loam of uniform texture. Heavy infestations of nematodes were developed and maintained on tomato plants. Inoculation of the test soil was accomplished by intimately mixing a weighed quantity of heavily infested soil and chopped tomato roots with twice its weight of clean soil. 600 grams of the infested soil mixture was weighed into a one-quart jar and a depression about 2" deep was made in the soil in the jar with the bottom of a 2 cm. test tube. The hole was filled with about 22 grams of dry sand, and the compound dripped into the sand. The compound to be tested was made into 10% solution, by weight, in acetone. The rate of application was 1 ml. of 10% solution per 600 grams of soil, or about 166 p. p. m. compound. In many instances, other dilutions were made of the test compound to result in approximate soil concentrations of 83 p. p. m., 41.5 p. p. m., 10 p. p. m., and 5 p. p. m.

In making the evaluation, the solution to be used was delivered from a graduated pipette directly onto the surface of the sand core in the culture described above. The jar was thereafter immediately sealed and shaken to distribute the treated sand core throughout the culture.

The screen cultures were held for 48 hours at 80° to 82° F. After 48 hours, each culture was transferred from the jar to a 4½" clay pot and placed in a greenhouse. Five days thereafter, two nematode-free tomato seedlings were transplanted into each pot and watered for 20 to 30 days. The plants were then removed from the pots, the roots washed free of adhering soil and compared with the roots of similar plants grown in infested but untreated soil. The degree of infection was determined by observing galls on the roots of the plants. Those tests in which there was no visible difference between the control and the treated plants were graded zero and those in which there had been complete control, were graded 100. In intermediate cases, the approximate degree of control was expressed as a percentage of control.

When the comppounds of the present invention were subjected to the above test, the following results were obtained:

| Compound | Percent Control, Concentration p. p. m. of compound | | | |
| --- | --- | --- | --- | --- |
| | 166 | 83 | 41.5 | 20 |
| 3-(p-chlorophenyl)-5-methyl rhodanine | 100 | -------- | 100 | 100 |
| 3-(p-chlorophenyl)-5-ethyl rhodanine | 100 | -------- | 100 | 100 |

These compounds, or mixtures containing them, combine high toxicity to soil pests with either low phytocidal action or an absence of such action. Thus, these agents are highly effective in controlling nematodes, as well as other soil pests, such as wire worms, fire ants, various species of root and crown infesting fungi, oak-root fungus in peach and citrus trees, etc. On the other hand, at the required concentration, the present compounds are relatively non-injurious to plants either directly or through deleterious action upon the properties of the soil. A particular advantage of these present soil treating agents is that, if used properly, they do not adversely affect plants as by over-stimulation. Another advantage of these compounds is that they are relatively safe to handle if certain simple precautions are taken such as by avoiding inhalation of the solvent fumes and promptly washing off with soap and water any liquid spilled on the hands or skin. Further, since mixtures containing the present agents are relatively non-flammable, no more than the usual precautions, such as are taken with common organic solvents, need be observed in handling.

A particularly important advantage of the present agents resides in their ease of application in soil treatment, there being no necessity to use a soil cover to prevent rapid dissipation of the agents. Thus, any suitable method of applying these compounds or mixtures thereof to the soil may be used. For example, a simple but effective method comprises punching holes in the soil at frequent intervals, such as one foot apart, and pouring a measured amount of the agents into said holes. Subsoil injectors of any suitable type, either hand-operated or mechanically operated, may likewise be used. In some cases, the agents may be dispersed or suspended in irrigation water with any suitable soap or other dispersing agent, thus combining a soil treatment with an established farm operation. Also, these compounds are generally insoluble to an extent that permits applying the compounds mixed in water as a thin slurry or creamy suspension to the irrigation water which then may be applied to furrows, flooded over the surface, or sprayed. The application to soil may also be made with dispersions containing other agents such as herbicides, fertilizers, etc. On the other hand, it may be desired to absorb the agents on inert finely divided solid carriers such as sand or dry soil, or talc, celite, kaolin, fuller's earth, pyrophyllite, diatomaceous earth, kieselguhr, hydrated lime, chalk, and gypsum or industrial fertilizers. These dry compositions containing between about 5% and about 95% active ingredient, may be broadcast in suitable broadcast apparatus and worked into the soil by plowing or harrowing, or like methods.

This application is a continuation-in-part of patent applications Serial Nos. 116,631, filed September 19, 1949, Serial No. 231,268, filed June 12, 1951, and Serial No. 308,513, filed September 8, 1952, all now abandoned.

I claim:

1. As a new composition of matter, a composition selected from the group consisting of 3-(p-chlorophenyl)-5-methyl rhodanine, and 3-(p-chlorophenyl)-5-ethyl rhodanine.

2. As a new composition of matter, 3-(p-chlorophenyl)-5-methyl rhodanine.

3. As a new composition of matter, 3-(p-chlorophenyl)-5-ethyl rhodanine.

4. A method of killing pests comprising applying to the pest habitat a compound selected from the group consisting of 3-(p-chlorophenyl)-5-methyl and 3-(p-chlorophenyl)-5-ethyl rhodanine.

5. The method of killing pests comprising applying to the pest habitat 3-(p-chlorophenyl)-5-methyl rhodanine.

6. A method of killing pests comprising applying to the pest habitat 3-(p-chlorophenyl)-5-ethyl rhodanine.

7. The method of treating seeds comprising applying to the seeds a small amount of a compound selected from the group consisting of 3-(p-chlorophenyl)-5-methyl rhodanine and 3-(p-chlorophenyl)-5-ethyl rhodanine.

8. The method of treating seeds comprising applying to the seeds a small amount of 3-(p-chlorophenyl)-5-methyl rhodanine.

9. The method of treating seeds comprising applying to the seeds a small amount or 3-(p-chlorophenyl)-5-ethyl rhodanine.

References Cited in the file of this patent

UNITED STATES PATENTS 2,510,725    Sundholm et al. _____ June 6, 1950

OTHER REFERENCES

Holmberg: Chem. Abst., vol. 4, p. 2285 (1910).